United States Patent Office 3,825,557
Patented July 23, 1974

3,825,557
O-(1-SUBSTITUTED - 3-METHYL-4-CHLORO-PYRAZOLO)-THIONOPHOSPHORIC (PHOSPHONIC) ACID ESTERS
Hellmut Hoffmann, Wuppertal-Elberfeld, and Wolfgang Behrenz and Ingeborg Hammann, Cologne, Germany, assignors to Bayer Aktiengesellschaft
No Drawing. Filed June 23, 1972, Ser. No. 265,844
Claims priority, application Germany, July 2, 1971,
P 21 32 938.4
Int. Cl. C07f 9/16, 9/40
U.S. Cl. 260—310 R       7 Claims

ABSTRACT OF THE DISCLOSURE

O-(1 - substituted - 3 - methyl - 4 - chloro-pyrazolo)-thionophosphoric (phosphonic) acid esters of the formula

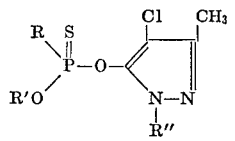

in which

R is an alkyl or alkoxy radical of 1 to 6 carbon atoms,
R' is alkyl of 1 to 6 carbon atoms, and
R" is alkyl or cyanoalkyl wherein the alkyl radical has 1 to 6 carbon atoms, or phenyl, which possess insecticidal and acaricidal properties.

---

The present invention relates to and has for its objects the provision of particular new O-(1-substituted-3-methyl-4-chloropyrazolo)-thionophosphoric (phosphonic) acid esters, i.e. O,O-dialkyl-O-(1-alkyl-, cyanoalkyl- or phenyl-3-methyl - 4 - chloro - pyrazolo)-thiono phosphoric acid esters and their alkanephosphonic acid ester analogues, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from U.S. Patent Specification 2,754,244 that O,O-dialkyl-O-pyrazolo-(thiono)phosphoric, for example O,O-dimethyl- (Compound A) or O,O-diethyl-O-[3-methyl-pyrazol-5-yl]thionophosphoric acid ester (Compound B), possess insecticidal properties.

The present invention provides, as new compounds, the O-pyrazolothionophosphoric(phosphonic) acid esters of the formula

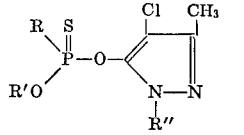

in which

R is an alkyl or alkoxy radical of 1 to 6 carbon atoms,
R' is alkyl of 1 to 6 carbon atoms, and
R" is alkyl or cyanoalkyl wherein the alkyl radical has 1 to 6 carbon atoms, or phenyl.

In the formula (I), R is preferably a straight-chain or branched lower alkyl or alkoxy radical of 1 to 4 carbon atoms, R' is preferably straight-chain or branched lower alkyl of 1 to 4 carbon atoms, and R" is preferably cyanoethyl, methyl, ethyl or phenyl.

Surprisingly, the O - pyrazolothionophosphoric (phosphonic) acid esters according to the invention display a higher insecticidal and acaricidal action than compounds of the prior art. The new compounds have proved particularly valuable in combating pests harmful to health and pests of stored products. Furthermore, some of the compounds display a surprisingly low toxicity towards warm-blooded animals. They thus represent a genuine enrichment of the art.

The present invention also provides a process for the preparation of an O - pyrazolo-thionophosphoric (phosphonic) acid ester of the formula (I) in which a pyrazole derivative of the formula

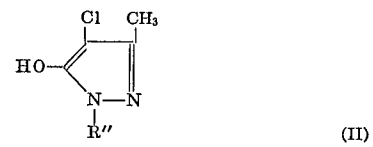

in which R" has the above-mentioned meaning, is reacted, in the presence of an acid-binding agent or in the form of an alkali metal salt, alkaline earth metal salt or ammonium salt thereof, with a thionophosphoric (phosphonic) acid ester halide of the general formula

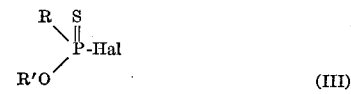

in which R and R' have the above-mentioned meanings, and Hal is halogen, preferably chlorine.

If O,O-diethylthionophosphoric acid ester chloride and 1,3-dimethyl-4-chloro-5-hydroxypyrazole are used as the starting materials, the course of the reaction can be represented by the following equation:

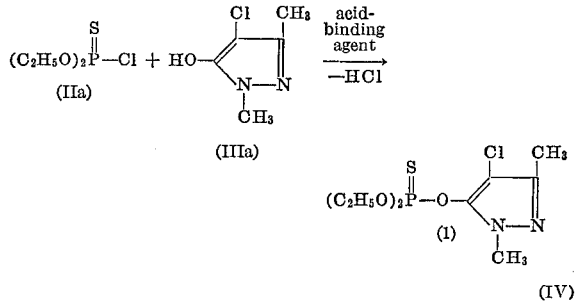

The pyrazole derivatives of the formula (II), which are required as starting materials, have hitherto not been described in the literature, but can be prepared as follows:

Starting from ethyl acetoacetate and substituted hydrazines, the corresponding pyrazolones are obtained, which are converted by means of sulfonylchloride into the chlorinated compounds, which then react with trialkylphosphites to give the hydroxypyrazole derivatives of the formula (II)

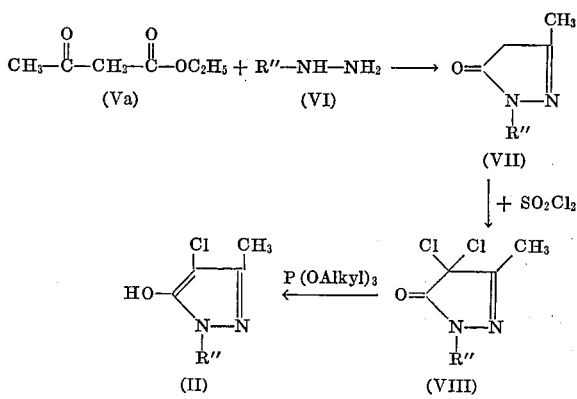

Examples of the pyrazole derivatives (II) are 1-methyl-, 1-ethyl- and 1-cyanoethyl-3-methyl-4-chloro-5-hydroxypyrazoles.

As examples of thionophosphoric (phosphonic) acid ester halides (III), there may be mentioned: O,O-dimethyl-, O,O-diethyl-, O,O-di-n-propyl, O,O-di-isopropyl, O,O-di-n-butyl, O,O-di-isobutyl, O,O-di-sec.-butyl O,O-di-tert.-butyl, O-methyl-O-ethyl and O-ethyl-O-isobutyl-thiono-phosphoric acid ester halides, and also O-methyl-, O-ethyl-, O-n-propyl-, O-isopropyl-, O-n-butyl-, O-iso-butyl- O-tert.-butyl and O-sec.-butylmethane-, -ethane-, -propane- and -butanethionophosphonic acid ester halides.

The preparative process is preferably carried out with the use of a suitable solvent or diluent. Practically any inert organic solvent can be used for this purpose, especially an aliphatic or aromatic optionally chlorinated hydrocarbon, such as benzene, toluene, xylene, benzine, methylene chloride, chloroform, carbon tetrachloride or chlorobenzene, an ether, such as diethyl ether, dibutyl ether or dioxane, a ketone, for example acetone, methyl ethyl ketone, methyl isopropyl ketone or methylisobutyl ketone, or a nitrile, such as acetonitrile or propionitrile.

Any customary acid acceptor can be used as the acid-binding agent. Alkali metal carbonates and alcoholates, such as sodium and potassium carbonate, methylate and ethylate, and also aliphatic, aromatic and heterocyclic amines, for example triethylamine, dimethylamine, dimethyl aniline, dimethylbenzylamine and pyridine, have proved particularly suitable.

The reaction temperatures can be varied over a substantial range. In general, the reaction is carried out at about 0 to 100° C., preferably about 20 to 70° C.

The reaction is generally carried out at normal pressure.

To carry out the process, the starting substances are in most cases employed in equimolar ratios. An excess of one or other reactant does not produce any significant advantages. The reaction is preferably carried out in the presence of one of the above-mentioned solvents and in the presence of an acid acceptor, at the indicated temperatures, and after stirring for several hours the reaction mixture is worked-up in the usual manner—with warming if appropriate.

The substances according to the invention are mostly obtained in the form of colorless to slightly colored oils which cannot be distilled without decomposition but can be freed of the last volatile constituents, and thus purified, by so-called "slight distillation," that is to say prolonged heating under reduced pressure to moderately elevated temperatures. The substances are generally characterized by the refractive index; however, some of the products are obtained as crystalline compounds having a sharp melting point.

As has already been mentioned, the new O-pyrazolothionophosphoric (phosphonic) acid esters are distinguished by an excellent insecticidal and acaricidal activity against plant pests, pests harmful to health and pests of stored products. They possess a good action both against sucking and against biting insects and mites (Acarina). At the same time they show a low phytotoxicity and some of the compounds show an extremely low toxicity towards warm-blooded animals. The $LD_{50}$ on oral administration to rats is between 500 and 1,000 mg./kg. for some of the compounds according to the invention.

For these reasons, the compounds according to the invention may be successfully employed as pesticides in plant protection and protection of stored products, and also in the hygiene field.

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the currant gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella); and the like.

Also to be classed with the biting insects contemplated herein are beetles (Coleoptera), for example the granary weevil (Sitophilus granarius=Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidius=Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the saw-toothed grain beetle (Oryzaephilus surinamensis), and also species living in the soil, for example wireworms (Agriotes spec.) and larvae of the cockchafer (Melolontha melolontha); cockroaches, such as the German cockroach (Blattella germanica), American cockroach (Periplaneta americana), Madeira cockroach (Leucophaea or Rhyparobia maderae), oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the eastern subterranean termite (Reticulitermes flavipes) and Hymenoptera such as ants, for example the garden ant (Lasius niger); and the like.

The Diptera contemplated herein comprise essentially the flies, such as the vinegar fly (Drosophila melanogaster), the Mediterranean fruit fly (Ceratitis capitata), the house fly (Musca domestica), the little house fly (Fannia canicularis), the black blow fly (Phormia regina) and bluebottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi); and the like.

With the mites (Acari) contemplated herein there are classed, in particular, the spider mites (Tetranychidae) such as the two-spotted spider mite (Tetranychus telarius=Tetranychus althaeae or Tetranychus urticae) and the European red mite (Paratetranychus pilosus=Panonychus ulmi), gall mites, for example the black currant gall mite (Eriophyes ribis) and tarsonemids, for example the broad mite (Hemitarsonemus latus) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspenions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfontaes, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides fertilizers, growth - regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.1–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.1–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

$LT_{100}$ test for *Diptera*

Test insects: *Musca domestica*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is periodically observed. The time which is necessary for a 100% destruction is determined.

The test insects the active compounds, the concentrations of the active compounds and the periods of time at which there is a 100% destruction can be seen from the following Table 1:

TABLE 1
($LT_{100}$ test for *Diptera*)

| Active compounds | | Active compound concentration of the solution in percent | $LT_{100}$ |
|---|---|---|---|
| (A) | 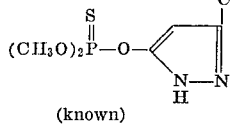 (known) | 0.2 | $8^h = 70\%$ |
| (B) | 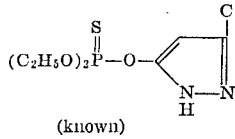 (known) | 0.2<br>0.02 | 105<br>$6^h = 75\%$ |
| (11) | 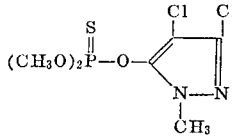 | 0.2<br>0.02<br>0.002 | 30'<br>75'<br>$8^h = 80\%$ |
| (5) | 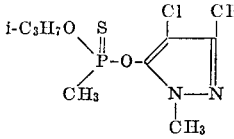 | 0.2<br>0.02 | 60<br>85 |
| (6) | 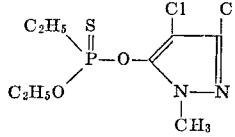 | 0.2<br>0.02<br>0.002 | 30'<br>110'<br>$8^h = 50\%$ |

EXAMPLE 2

$LT_{100}$ test for *Diptera*

Test animals: *Aedes aegypti*
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% destruction is determined.

The active compounds, the concentrations of the active compounds, the test insects and the periods of time at which there is a 100% destruction can be seen from the following Table 2:

TABLE 2
($LT_{100}$ test for *Diptera*)

| Active compounds | | Active compound concentrations of the solution in percent | $LT_{100}$ |
|---|---|---|---|
| A) | 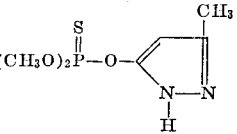 (known) | 0.2 | $3^h = 30\%$ |
| (B) | 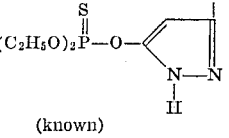 (known) | 0.2 | 180' |
| (11) | 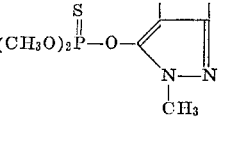 | 0.2<br>0.02<br>0.002 | 60'<br>60'<br>$3^h = 90\%$ |
| (1) | 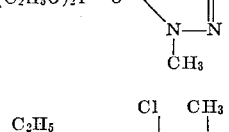 | 0.2<br>0.02<br>0.002 | 60'<br>60'<br>180' |
| (6) | 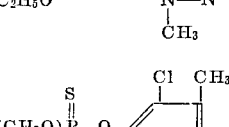 | 0.2<br>0.02<br>0.002<br>0.0002 | 60'<br>60'<br>180'<br>$3^h = 90\%$ |
| (4) | 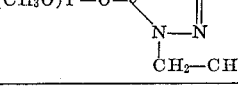 | 0.2<br>0.02<br>0.002 | 60'<br>120'<br>180' |

EXAMPLE 3

$LD_{100}$ test

Test insects: *Sitophilus granarius*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The destruction is determined as a percentage.

The test insects, the active compounds, the concentrations of the active compounds and the results can be seen from the following Table 3:

TABLE 3
(LD$_{100}$ test)

| Active compounds | Structure | Active compound concentrations of the solution in percent | Destruction in percent |
|---|---|---|---|
| (A) | (CH$_3$O)$_2$P(S)—O—[pyrazole with CH$_3$, N—NH] (known) | 0.2 | 0 |
| (B) | (C$_2$H$_5$O)$_2$P(S)—O—[pyrazole with CH$_3$, N—NH] (known) | 0.2<br>0.02 | 100<br>0 |
| (11) | (CH$_3$O)$_2$P(S)—O—[pyrazole with Cl, CH$_3$, N—N—CH$_3$] | 0.2<br>0.02<br>0.002 | 100<br>100<br>0 |
| (1) | (C$_2$H$_5$O)$_2$P(S)—O—[pyrazole with Cl, CH$_3$, N—N—CH$_3$] | 0.2<br>0.02<br>0.002 | 100<br>90<br>40 |
| (5) | i-C$_3$H$_7$O(CH$_3$)P(S)—O—[pyrazole with Cl, CH$_3$, N—N—CH$_3$] | 0.2<br>0.92<br>0.002 | 100<br>100<br>0 |
| (6) | C$_2$H$_5$(C$_2$H$_5$O)P(S)—O—[pyrazole with Cl, CH$_3$, N—N—CH$_3$] | 0.2<br>0.02<br>0.002 | 100<br>100<br>0 |
| (4) | (CH$_3$O)$_2$P(S)—O—[pyrazole with Cl, CH$_3$, N—N—CH$_2$—CH$_2$—CN] | 0.2<br>0.02<br>0.002 | 100<br>100<br>0 |
| (2) | (C$_2$H$_5$O)$_2$P(S)—O—[pyrazole with Cl, CH$_3$, N—N—CH$_2$—CH$_2$—CN] | 0.2<br>0.02<br>0.002 | 100<br>100<br>0 |
| (10) | C$_2$H$_5$(C$_2$H$_5$O)P(S)—O—[pyrazole with Cl, CH$_3$, N—N—CH$_2$—CH$_2$—CN] | 0.2<br>0.02<br>0.002 | 100<br>100<br>95 |
| (3) | (CH$_3$O)$_2$P(S)—O—[pyrazole with Cl, CH$_3$, N—N—C$_6$H$_5$] | 0.2<br>0.02<br>0.002 | 100<br>100<br>0 |

EXAMPLE 4

LD$_{100}$ test

Test insects: *Blatta orientalis*
Solvent: acetone 2 parts by weight of active compound are dissolved in 1000 parts by volume of solvent. The solution so obtained is diluted with further solvent to the desired concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 4:

TABLE 4
(LD$_{100}$ test)

| Active compounds | Structure | Active compound concentrations of the solution in percent | Destruction in percent |
|---|---|---|---|
| (A) | (CH$_3$O)$_2$P(S)—O—[pyrazole with CH$_3$, N—NH] (known) | 0.2 | 0 |
| (B) | (C$_2$H$_5$O)$_2$P(S)—O—[pyrazole with CH$_3$, N—NH] (known) | 0.2<br>0.02 | 100<br>0 |
| (11) | (CH$_3$O)$_2$P(S)—O—[pyrazole with Cl, CH$_3$, N—N—CH$_3$] | 0.2<br>0.02<br>0.002 | 100<br>100<br>60 |
| (1) | (C$_2$H$_5$O)$_2$P(S)—O—[pyrazole with Cl, CH$_3$, N—N—CH$_3$] | 0.2<br>0.02<br>0.002 | 100<br>100<br>0 |
| (5) | i-C$_3$H$_7$O(CH$_3$)P(S)—O—[pyrazole with Cl, CH$_3$, N—N—CH$_3$] | 0.2<br>0.02<br>0.002<br>0.0002 | 100<br>100<br>100<br>60 |
| (6) | C$_2$H$_5$(C$_2$H$_5$O)P(S)—O—[pyrazole with Cl, CH$_3$, N—N—CH$_3$] | 0.2<br>0.02<br>0.002 | 100<br>100<br>30 |

EXAMPLE 5

LD$_{100}$ test

Test insects: *Ornithodorus moubata* (Nymphs)
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 5:

TABLE 5
($LD_{100}$ test)

| Active compounds | Active compound concentrations of the solution in percent | Destruction in percent |
|---|---|---|
| (A) $(CH_3O)_2\overset{S}{\underset{\parallel}{P}}-O-\underset{\underset{H}{N}-N}{\overset{CH_3}{\diagup}}$ (known) | 0.2 | 40 |
| (1) $(C_2H_5O)_2\overset{S}{\underset{\parallel}{P}}-O-\underset{\underset{CH_3}{N}-N}{\overset{Cl\ CH_3}{\diagup}}$ | 0.2<br>0.04<br>0.008<br>0.0016 | 100<br>100<br>100<br>60 |
| (5) $i\text{-}C_3H_7O\diagdown\overset{S}{\underset{\parallel}{P}}-O-\underset{\underset{CH_3}{N}-N}{\overset{Cl\ CH_3}{\diagup}}$<br>$CH_3\diagup$ | 0.2<br>0.04<br>0.008 | 100<br>100<br>02 |
| (6) $C_2H_5\diagdown\overset{S}{\underset{\parallel}{P}}-O-\underset{\underset{CH_3}{N}-N}{\overset{Cl\ CH_3}{\diagup}}$<br>$C_2H_5O\diagup$ | 0.2<br>0.04<br>0.008 | 100<br>100<br>0 |
| (4) $(CH_3O)_2\overset{S}{\underset{\parallel}{P}}-O-\underset{\underset{CH_2-CH_2-CN}{N-N}}{\overset{Cl\ CH_3}{\diagup}}$ | 0.2<br>0.04 | 100<br>0 |
| (2) $(C_2H_5O)_2\overset{S}{\underset{\parallel}{P}}-O-\underset{\underset{CH_2-CH_2-CN}{N-N}}{\overset{Cl\ CH_3}{\diagup}}$ | 0.2<br>0.04<br>0.008 | 100<br>100<br>20 |
| (7) $i\text{-}C_3H_7O\diagdown\overset{S}{\underset{\parallel}{P}}-O-\underset{\underset{CH_2-CH_2-CN}{N-N}}{\overset{Cl\ CH_3}{\diagup}}$<br>$CH_3\diagup$ | 0.2<br>0.04 | 100<br>20 |
| (10) $C_2H_5\diagdown\overset{S}{\underset{\parallel}{P}}-O-\underset{\underset{CH_2-CH_2-CN}{N-N}}{\overset{Cl\ CH_3}{\diagup}}$<br>$C_2H_5O\diagup$ | 0.2<br>0.04 | 100<br>80 |

TABLE 5—Continued

| Active compounds | Active compound concentrations of the solution in percent | Destruction in percent |
|---|---|---|
| (3) $(CH_3O)_2\overset{S}{\underset{\parallel}{P}}-O-\underset{\underset{N-N}{\phantom{X}}}{\overset{Cl\ CH_3}{\diagup}}$—phenyl | 0.2<br>0.04 | 100<br>60 |
| (12) $(C_2H_5O)_2\overset{S}{\underset{\parallel}{P}}-O-\underset{\underset{N-N}{\phantom{X}}}{\overset{Cl\ CH_3}{\diagup}}$—phenyl | 0.2<br>0.04<br>0.008 | 100<br>100<br>80 |
| (8) $i\text{-}C_3H_7O\diagdown\overset{S}{\underset{\parallel}{P}}-O-\underset{\underset{N-N}{\phantom{X}}}{\overset{Cl\ CH_3}{\diagup}}$—phenyl<br>$CH_3\diagup$ | 0.2<br>0.04 | 100<br>60 |
| (9) $C_2H_5\diagdown\overset{S}{\underset{\parallel}{P}}-O-\underset{\underset{N-N}{\phantom{X}}}{\overset{Cl\ CH_3}{\diagup}}$—phenyl<br>$C_2H_5O\diagup$ | 0.2<br>0.04 | 100<br>20 |

EXAMPLE 6

Mosquito larvae test

Test insects: *Aedes aegypti*
Solvent: 99 parts by weight acetone
Emulsifier: 1 part by weight benzylhydroxydiphenyl polyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test insects and the results can be seen from Table 6:

TABLE 6
(Mosquito larvae test)

| Active compounds | Active compound concentrations of the solution in p.p.m. | Degree of destruction in percent |
|---|---|---|
| (A) $(CH_3O)_2P(S)-O-$[3-methylpyrazol-5-yl, NH] (known) | 10 | — |
| (11) $(CH_3O)_2P(S)-O-$[4-Cl, 3-CH_3, N-CH_3 pyrazolyl] | 10 / 1 / 0.1 | 100 / 100 / 0 |
| (1) $(C_2H_5O)_2P(S)-O-$[4-Cl, 3-CH_3, N-CH_3 pyrazolyl] | 10 / 1 | 100 / 70 |
| (5) $i$-C_3H_7O, CH_3–P(S)-O-[4-Cl, 3-CH_3, N-CH_3 pyrazolyl] | 10 / 1 / 0.1 | 0 / 100 / 0 |
| (6) C_2H_5, C_2H_5O–P(S)-O-[4-Cl, 3-CH_3, N-CH_3 pyrazolyl] | 10 / 1 | 100 / 90 |
| (4) $(CH_3O)_2P(S)-O-$[4-Cl, 3-CH_3, N-CH_2CH_2CN pyrazolyl] | 10 / 1 / 0.1 | 100 / 100 / 0 |
| (2) $(C_2H_5O)_2P(S)-O-$[4-Cl, 3-CH_3, N-CH_2CH_2CN pyrazolyl] | 10 / 1 | 100 / 90 |
| (7) $i$-C_3H_7O, CH_3–P(S)-O-[4-Cl, 3-CH_3, N-CH_2CH_2CN pyrazolyl] | 10 / 1 | 100 / 0 |
| (10) C_2H_5, C_2H_5O–P(S)-O-[4-Cl, 3-CH_3, N-CH_2CH_2CN pyrazolyl] | 10 / 1 | 100 / 40 |
| (3) $(CH_3O)_2P(S)-O-$[4-Cl, 3-CH_3, N-phenyl pyrazolyl] | 10 / 1 / 0.1 | 100 / 100 / 30 |
| (12) $(C_2H_5O)_2P(S)-O-$[4-Cl, 3-CH_3, N-phenyl pyrazolyl] | 10 / 1 | 100 / 0 |

EXAMPLE 7

Phaedon larvae test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 7:

TABLE 7
(*Phaedon* larvae test)

| Active compounds | Active compound concentrations in percent | Degree of destruction in percent after 3 days |
|---|---|---|
| (A) $(CH_3O)_2P(S)-O-$[3-CH_3 pyrazolyl, NH] (known) | 0.1 | 0 |
| (11) $(CH_3O)_2P(S)-O-$[4-Cl, 3-CH_3, N-CH_3 pyrazolyl] | 0.1 / 0.01 | 100 / 100 |
| (1) $(C_2H_5O)_2P(S)-O-$[4-Cl, 3-CH_3, N-CH_3 pyrazolyl] | 0.1 / 0.01 | 100 / 100 |
| (6) C_2H_5, C_2H_5O–P(S)-O-[4-Cl, 3-CH_3, N-CH_3 pyrazolyl] | 0.1 / 0.01 / 0.001 | 100 / 100 / 95 |
| (5) $i$-C_3H_7O, CH_3–P(S)-O-[4-Cl, 3-CH_3, N-CH_3 pyrazolyl] | 0.1 / 0.01 | 100 / 100 |

TABLE 7—Continued

| Active compounds | Active compound concentrations in percent | Degree of destruction in percent after 3 days |
|---|---|---|
| (4) $(CH_3O)_2P(=S)-O-$[pyrazole with Cl, $CH_3$, $N-CH_2-CH_2-CN$] | 0.1 / 0.01 / 0.001 | 100 / 100 / 70 |
| (10) $C_2H_5-P(=S)(OC_2H_5)-O-$[pyrazole with Cl, $CH_3$, $N-CH_2-CH_2-CN$] | 0.1 / 0.01 / 0.001 | 100 / 100 / 95 |
| (7) $i-C_3H_7O-P(=S)(CH_3)-O-$[pyrazole with Cl, $CH_3$, $N-CH_2-CH_2-CN$] | 0.1 / 0.01 / 0.001 | 100 / 100 / 25 |
| (3) $(CH_3O)_2P(=S)-O-$[pyrazole with Cl, $CH_3$, N-phenyl] | 0.1 / 0.01 | 100 / 100 |
| (12) $(C_2H_5O)_2P(=S)-O-$[pyrazole with Cl, $CH_3$, N-phenyl] | 0.1 / 0.01 | 100 / 100 |
| (9) $C_2H_5-P(=S)(OC_2H_5)-O-$[pyrazole with Cl, $CH_3$, N-phenyl] | 0.1 / 0.01 | 100 / 100 |

EXAMPLE 8

*Myzus* test (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 8:

TABLE 8

(*Myzus* test)

| Active compounds | Active compound concentrations in percent | Degree of destruction in percent after 1 day |
|---|---|---|
| (A) (known) $(CH_3O)_2P(=S)-O-$[pyrazole with $CH_3$, NH] | 0.1 | 0 |
| (B) (known) $(C_2H_5O)_2P(=S)-O-$[pyrazole with $CH_3$, NH] | 0.1 / 0.01 / 0.001 | 99 / 40 / 0 |
| (11) $(CH_3O)_2P(=S)-O-$[pyrazole with Cl, $CH_3$, $N-CH_3$] | 0.1 / 0.01 / 0.001 | 100 / 95 / 60 |
| (1) $(C_2H_5O)_2P(=S)-O-$[pyrazole with Cl, $CH_3$, $N-CH_3$] | 0.1 / 0.01 / 0.001 | 100 / 100 / 95 |
| (6) $C_2H_5-P(=S)(OC_2H_5)-O-$[pyrazole with Cl, $CH_3$, $N-CH_3$] | 0.1 / 0.01 / 0.001 / 0.0001 | 100 / 100 / 100 / 100 |
| (5) $i-C_3H_7O-P(=S)(CH_3)-O-$[pyrazole with Cl, $CH_3$, $N-CH_3$] | 0.1 / 0.01 / 0.001 / 0.0001 | 100 / 100 / 100 / 80 |
| (2) $(C_2H_5O)_2P(=S)-O-$[pyrazole with Cl, $CH_3$, $N-CH_2-CH_2-CN$] | 0.1 / 0.01 / 0.001 | 100 / 98 / 85 |
| (10) $C_2H_5-P(=S)(OC_2H_5)-O-$[pyrazole with Cl, $CH_3$, $N-CH_2-CH_2-CN$] | 0.1 / 0.01 / 0.001 | 100 / 100 / 98 |
| (7) $i-C_3H_7O-P(=S)(CH_3)-O-$[pyrazole with Cl, $CH_3$, $N-CH_2-CH_2-CN$] | 0.1 / 0.01 / 0.001 | 100 / 100 / 99 |

EXAMPLE 9

*Tetranychus* test/resistant

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 9:

TABLE 9
(*Tetranychus* test/resistant)

| Active compounds | | Active compound concentrations in percent | Degree of destruction in percent after 2 days |
|---|---|---|---|
| (A) | 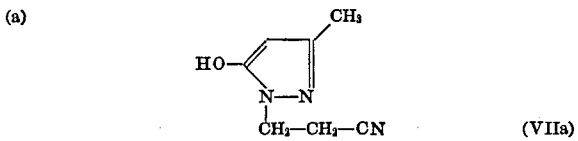 (known) | 0.1 | 0 |
| (5) | 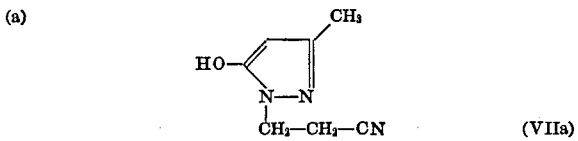 | 0.1 | 95 |
| (7) | 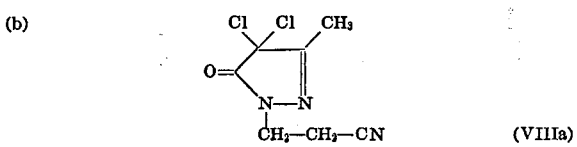 | 0.1 | 100 |

The process of this invention is illustrated in and by the following preparative Examples.

EXAMPLE 10

(a)

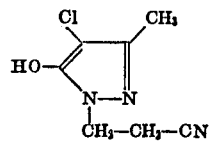

(VIIa)

130 g. of ethyl acetoacetate are added to a solution of 85 g. of cyanoethylhydrazine in 400 ml. of ethanol, in the course of which the temperature rises to 55° C.; the solution is further stirred overnight, seeded and cooled to 0° C. The precipitate which has separated out is filtered off and dried over clay. 119 g. (79% of theory) of 1-cyanoethyl-3-methyl-5-hydroxypyrazole of melting point 110° C. are obtained.

(b)

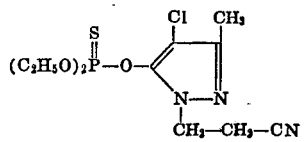

(VIIIa)

45 g. (0.3 mole) of the product obtained under (a), dissolved in 300 ml. of methylene chloride, are treated with 84 g. of sulfonylchloride at the boil. The mixture is kept for one hour at the boil, the volatile constituent is distilled off and the residue is subjected to slight distillation. 62 g. (94% of theory) of the desired substance of refractive index $n_D^{24}$ 1.5095 are obtained.

(c)

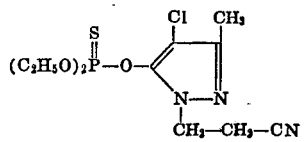

(IIa)

36 g. of triethylphosphite are added to a solution of 44 g. (0.2 mole) of the product obtained under (b) in 70 ml. of ethanol, whereupon the temperature of the mixture rises to 65° C. After stirring for 1 to 2 hours the precipitate is filtered off and dried. 22 g. (60% of theory) of 1-cyanoethyl-3-methyl-4-chloro-5-hydroxypyrazole of melting point 154–156° C. are obtained.

(d)

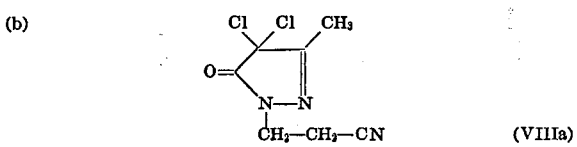

(2)

28 g. (0.15 mole) of O,O-diethylthionophosphoric acid ester chloride are added dropwise to a mixture of 28 g. (0.15 mole) of 1 - cyanoethyl-3-methyl-4-chloro-5-hydroxypyrazole and 23 g. of potassium carbonate in 200 ml. of acetonitrile, in the course of which the internal temperature rises to 23–31° C. Thereafter, the reaction mixture is heated to 60–70° C. for 3 hours while stirring, cooled, poured into water and extracted by shaking with benzene. The organic phase is washed with water and dried, the solvent is stripped off under reduced pressure and the residue is subjected to "slight distillation." 44 g. (87% of theory) of O,O-diethyl-O-(1-cyanoethyl-3-methyl - 4-chloropyrazol-5-yl)-thionophosphoric acid ester of refractive index $n_D^{25}$ 1.5050 are obtained.

EXAMPLE 11

(a)

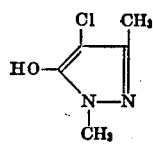

(IIb)

1,3-dimethyl-4-chloro-5-hydroxypyrazole (melting point 170–171° C.) is prepared from ethyl acetoacetate and monomethylhydrazine, with subsequent chlorination, as set forth in Example 10(a), (b), (c).

(b)

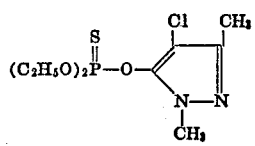

(I)

19 g. (0.1 mole) of O,O-diethylthionophosphoric acid ester chloride are added to 15 g. (0.1 mole) of 1,3-dimethyl-4-chloro-5-hydroxypyrazole as produced in (a) and 15 g. of potassium carbonate in 150 ml. of acetonitrile, in the course of which the temperature rises to 26–38° C. Thereafter the batch is warmed to 60° C. for 3 hours while stirring, cooled, poured into water and extracted by shaking with benzene. The organic phase is washed with water, the solvent is removed under reduced pressure and the residue is subjected to "slight distillation."

26 g. (87% of theory) of O,O-diethyl-O-(1,3-dimethyl-4-chloro-pyrazol-5-yl)-thionophosphoric acid ester of refractive index $n_D^{24}$ 1.4980 are obtained.

The following compounds are prepared in a manner analogous to that described in the preceding Examples:

| | Structure | Physical properties | Yield (percent of theory) |
|---|---|---|---|
| (3) | (CH$_3$O)$_2$P(S)—O—[4-Cl-3-CH$_3$-1-phenyl-pyrazol-5-yl] | $n_D^{25}$:1.5648 | 80 |
| (4) | (CH$_3$O)$_2$P(S)—O—[4-Cl-3-CH$_3$-1-(CH$_2$CH$_2$CN)-pyrazol-5-yl] | *76–77° | 77 |
| (5) | i-C$_3$H$_7$O(CH$_3$)P(S)—O—[4-Cl-3-CH$_3$-1-CH$_3$-pyrazol-5-yl] | $n_D^{24}$:1.5105 | 90 |
| (6) | C$_2$H$_5$O(C$_2$H$_5$)P(S)—O—[4-Cl-3-CH$_3$-1-CH$_3$-pyrazol-5-yl] | $n_D^{24}$:1.5070 | 80 |
| (7) | i-C$_3$H$_7$O(CH$_3$)P(S)—O—[4-Cl-3-CH$_3$-1-(CH$_2$CH$_2$CN)-pyrazol-5-yl] | $n_D^{25}$:1.5155 | 83 |
| (8) | (CH$_3$)$_2$CH—O(CH$_3$)P(S)—O—[4-Cl-3-CH$_3$-1-phenyl-pyrazol-5-yl] | $n_D^{25}$:1.5532 | 80 |
| (9) | C$_2$H$_5$O(C$_2$H$_5$)P(S)—O—[4-Cl-3-CH$_3$-1-phenyl-pyrazol-5-yl] | $n_D^{25}$:1.5591 | 80 |
| (10) | C$_2$H$_5$O(C$_2$H$_5$)P(S)—O—[4-Cl-3-CH$_3$-1-(CH$_2$CH$_2$CN)-pyrazol-5-yl] | $n_D^{25}$:1.5180 | 81 |
| (11) | (CH$_3$O)$_2$P(S)—O—[4-Cl-3-CH$_3$-1-CH$_3$-pyrazol-5-yl] | $n_D^{24}$:1.5105 | 77 |
| (12) | (C$_2$H$_5$O)$_2$P(S)—O—[4-Cl-3-CH$_3$-1-phenyl-pyrazol-5-yl] | $n_D^{22}$:1.5529 | 86 |

* Melting point.

It will be appreciated that the instant specification and examples are set forth by way of illustration and not limitation, and that various modifications and changes may be made without departing from the spirit and scope of the present invention.

What is claimed is:

1. An O-pyrazolothionophosphoric (phosphonic) acid ester of the formula

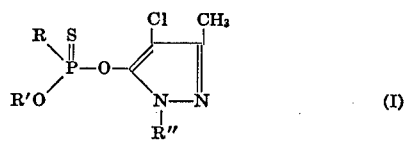

(I)

in which

R is alkyl or alkoxy each of 1 to 6 carbon atoms,
R' is alkyl of 1 to 6 carbon atoms, and
R" is alkyl or cyanoalkyl wherein the alkyl radical of each is of 1 to 6 carbon atoms, or phenyl.

2. A compound according to claim 1 in which R is lower alkyl or alkoxy, R' is lower alkyl and R" is cyanoethyl, methyl, ethyl or phenyl.

3. The compound according to claim 1 wherein such compound is O,O-diethyl-O-(1,3-dimethyl-4-chloro-pyrazol-5-yl)-thionophosphoric acid ester of the formula

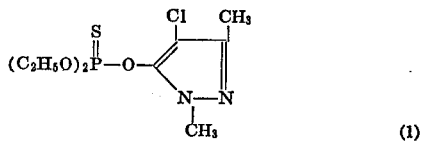

(1)

4. The compound according to claim 1 wherein such compound is O-isopropyl-O-(1,3-dimethyl-4-chloro-pyrazol-5-yl)-methanethionophosphonic acid ester of the formula

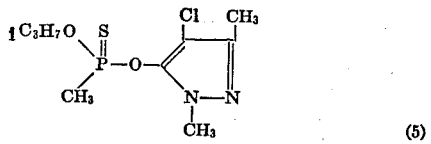

(5)

5. The compound according to claim 1 wherein such compound is O-ethyl-O-(1,3-dimethyl-4-chloro-pyrazol-5-yl)-ethanethionophosphonic acid ester of the formula

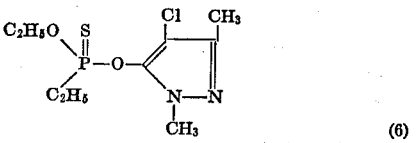

(6)

6. The compound according to claim 1 wherein such compound is O-ethyl-O-(1-cyanoethyl-3-methyl-4-chloropyrazol-5-yl) - ethanethionophosphonic acid ester of the formula
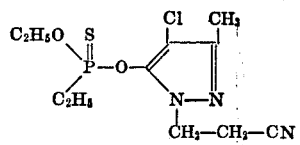
(10)
7. The compound according to claim 1 wherein such compound is O,O-dimethyl-O-(1,3-dimethyl-4-chloro-pyrazol-5-yl)-thionophosphoric acid ester of the formula
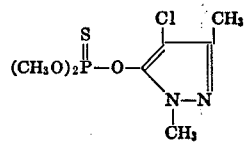
(11)
References Cited
UNITED STATES PATENTS
| | | | |
|---|---|---|---|
| 2,754,244 | 7/1956 | Gysin et al. | 260—310 R |
| 3,216,894 | 11/1965 | Lorenz et al. | 260—310 R |
FOREIGN PATENTS
| | | | |
|---|---|---|---|
| 728,152 | 2/1966 | Canada | 260—310 R |
| 930,212 | 7/1955 | Germany | 260—310A |
NATALIE TROUSOF, Primary Examiner
U.S. Cl. X.R.
424—200

UNITED STATES PATENT OFFICE
CERTIFICATE OF CORRECTION

Patent No. 3,825,557                    Dated July 23, 1974

Inventor(s) Hellmut Hoffmann et al.

It is certified that error appears in the above-identified patent and that said Letters Patent are hereby corrected as shown below:

Col. 5, line 54, after "aryl" correct spelling of "sulfonates".

Col. 8, Table 2, Compound (4), under column "$LT_{100}$", change "69" to --60--.

Col. 8, Table 2, Compound (1), under column "$LT_{100}$", cancel "60", second occurrence, and substitute --120--.

Col. 9, Table 3, Compound (5), second column of Table, cancel "0.92" and substitute --0.02--.

Col. 11, Table 5, Compound (5), last column of Table, cancel "02" and substitute --20--.

Col. 11, Table 5, Compound (2), last column of Table, cancel "20" and substitute --0--.

Col. 13, Table 6, Compound (5), last column of Table, cancel "10⁰" and substitute --100--.

Col. 17, Table 9, Compound (5), in the formula, cancel "$H_3$" and substitute --$CH_3$--.

Signed and sealed this 3rd day of December 1974.

(SEAL)
Attest:

McCOY M. GIBSON JR.               C. MARSHALL DANN
Attesting Officer                 Commissioner of Patents